April 10, 1956     R. I. GARDNER     2,741,460
POWER TONGS AND CONTROL SYSTEM THEREFOR
Filed Oct. 23, 1950     6 Sheets-Sheet 3
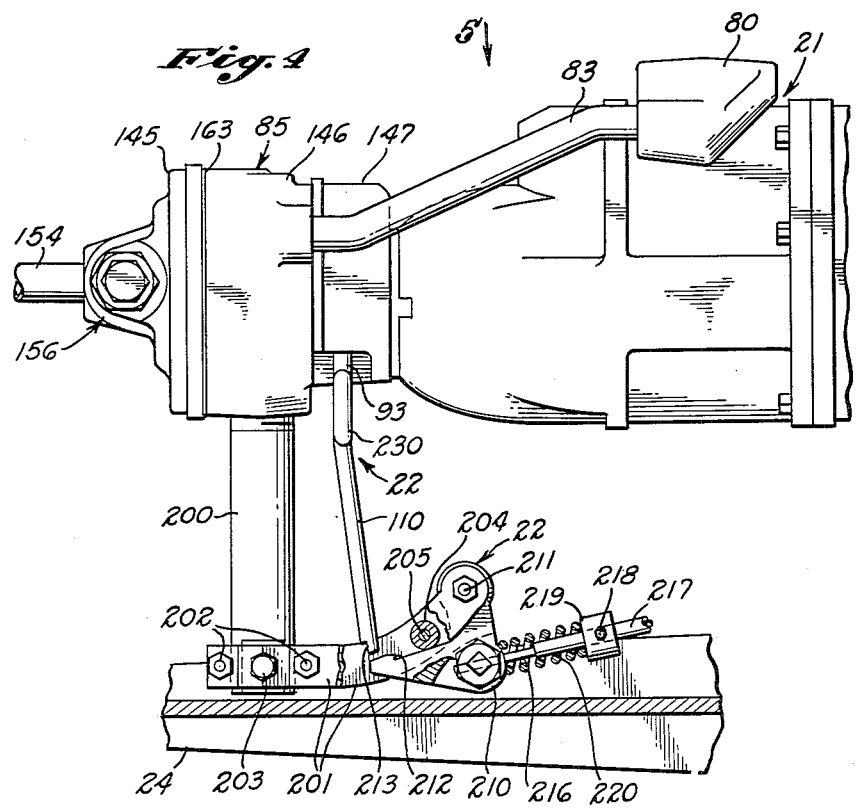
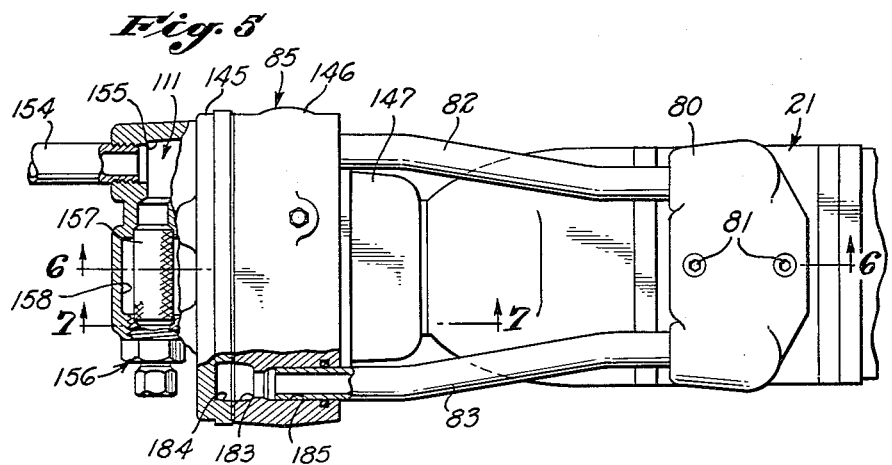
INVENTOR:
ROBERT I. GARDNER
BY HIS ATTORNEYS
HARRIS, KIECH, FOSTER & HARRIS

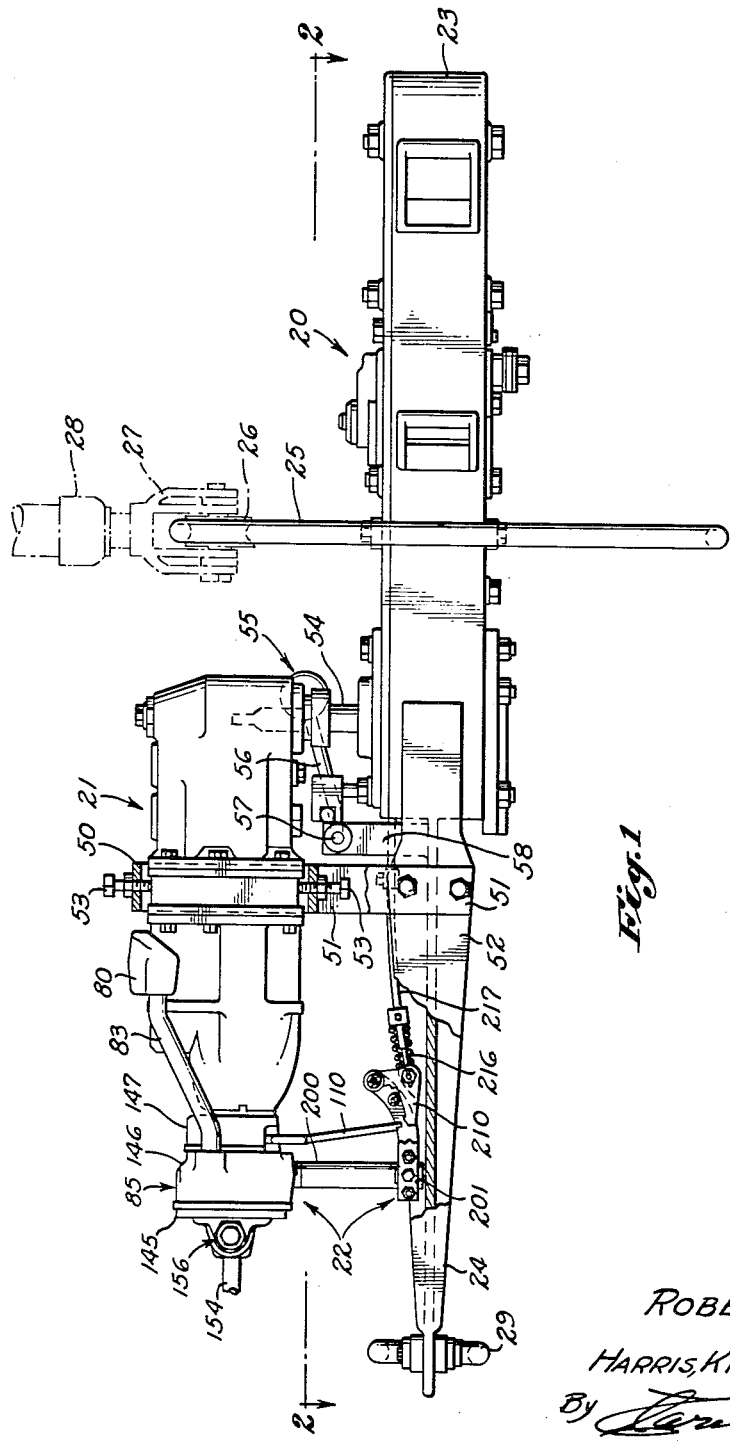

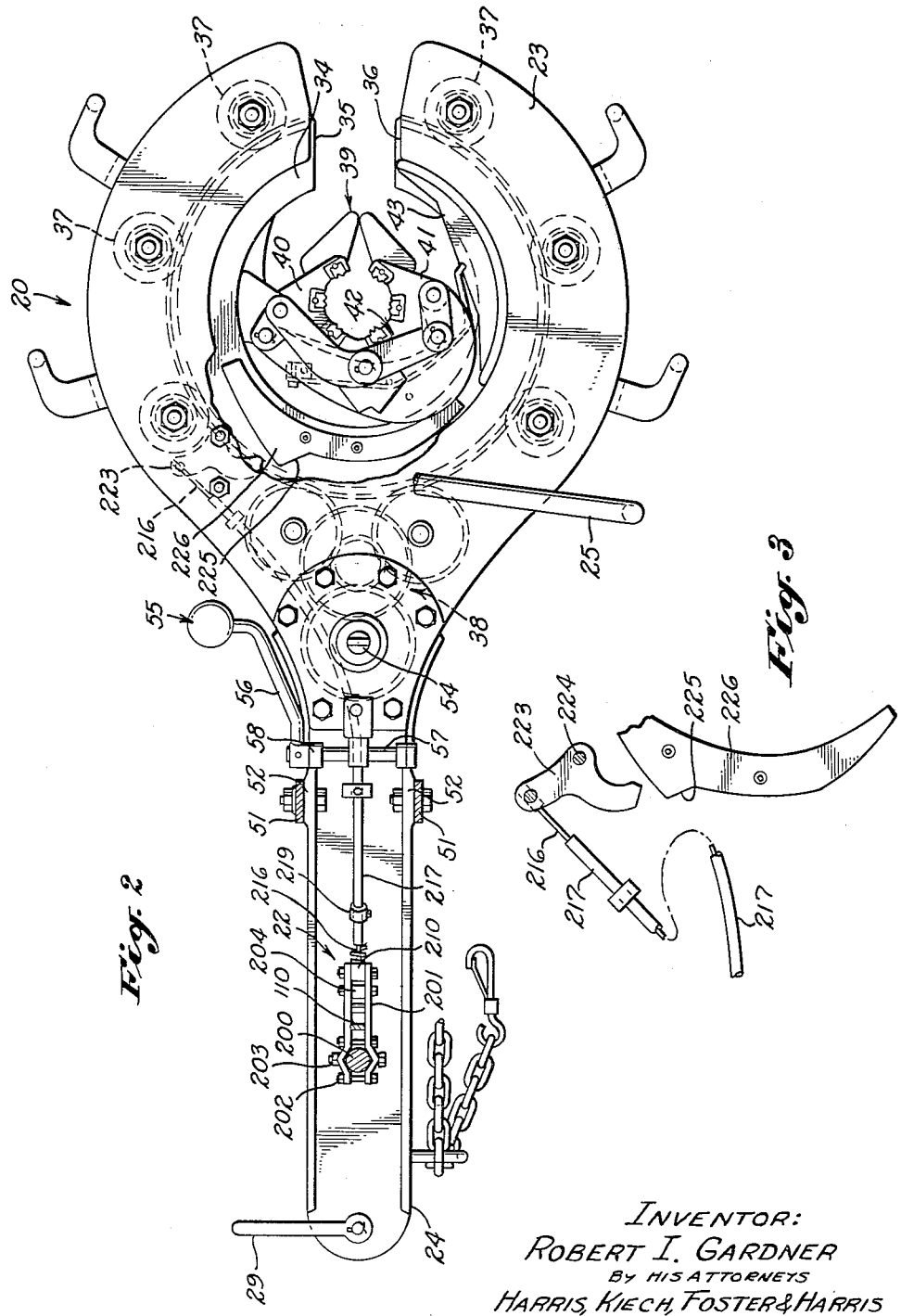

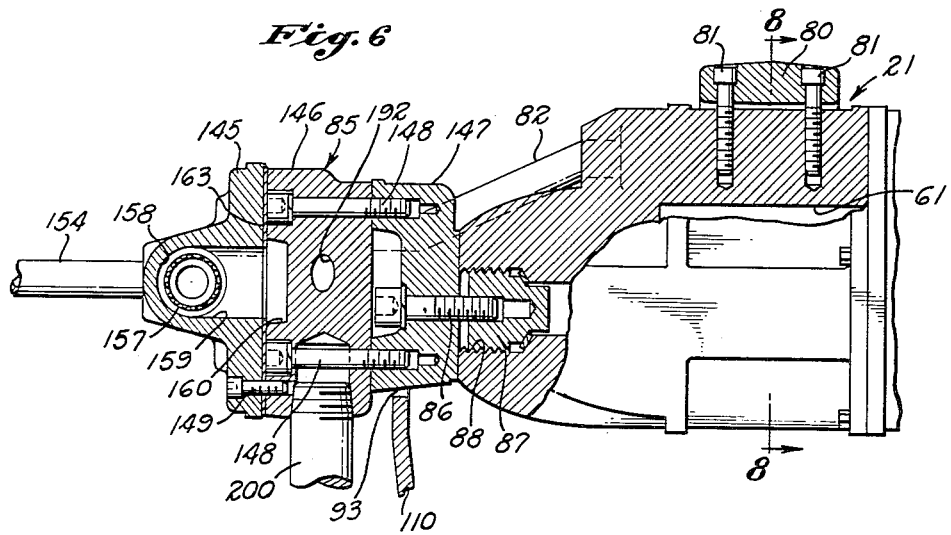
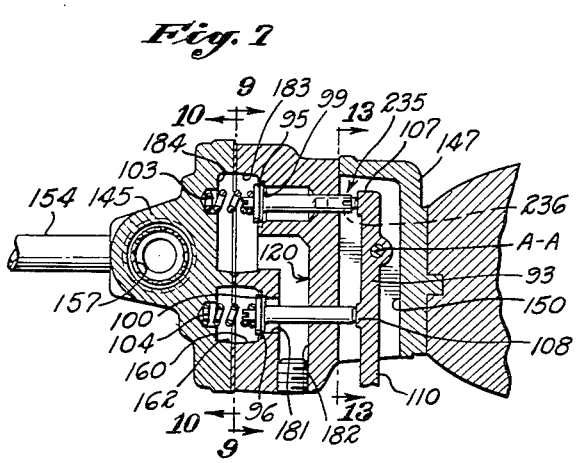
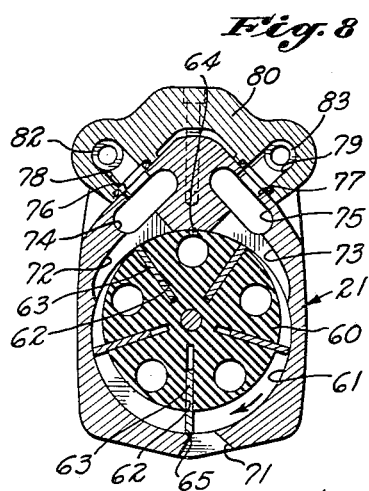
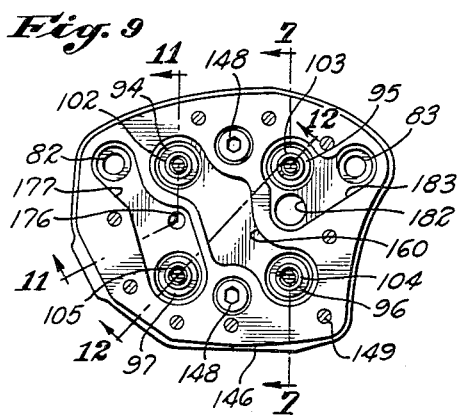
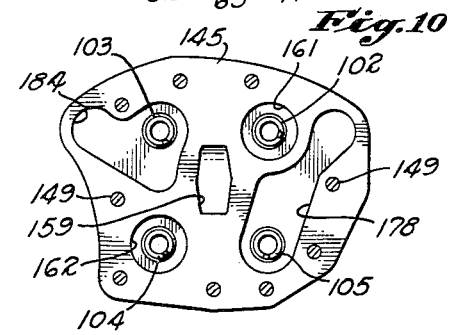

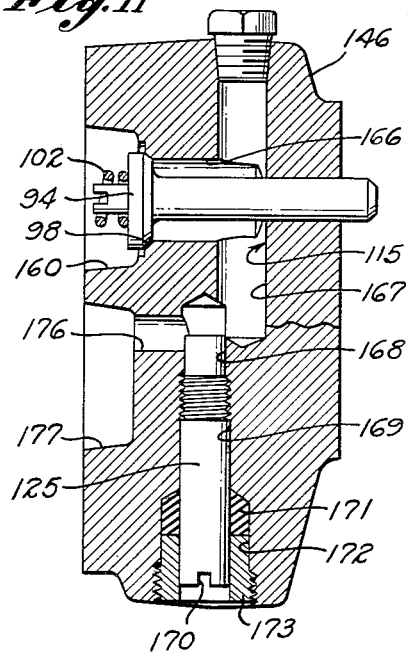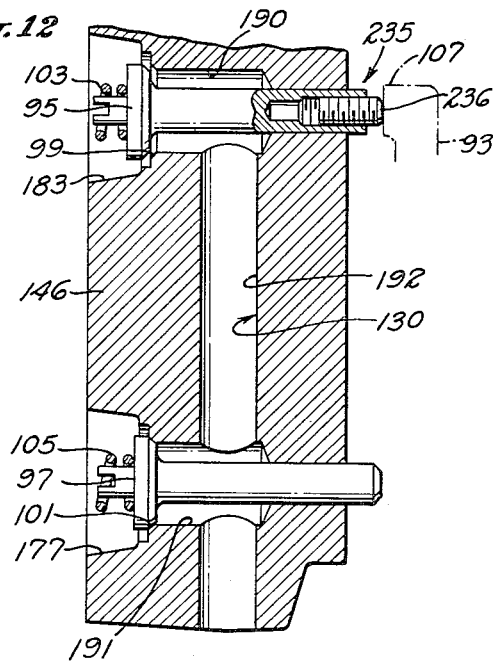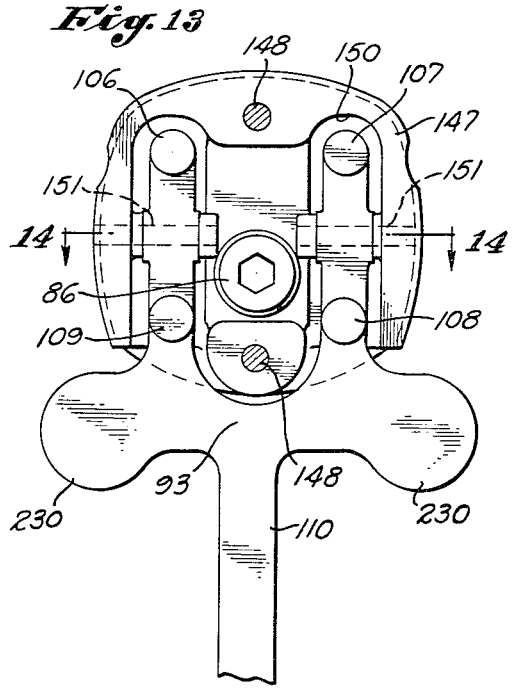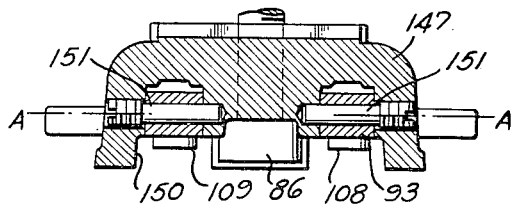

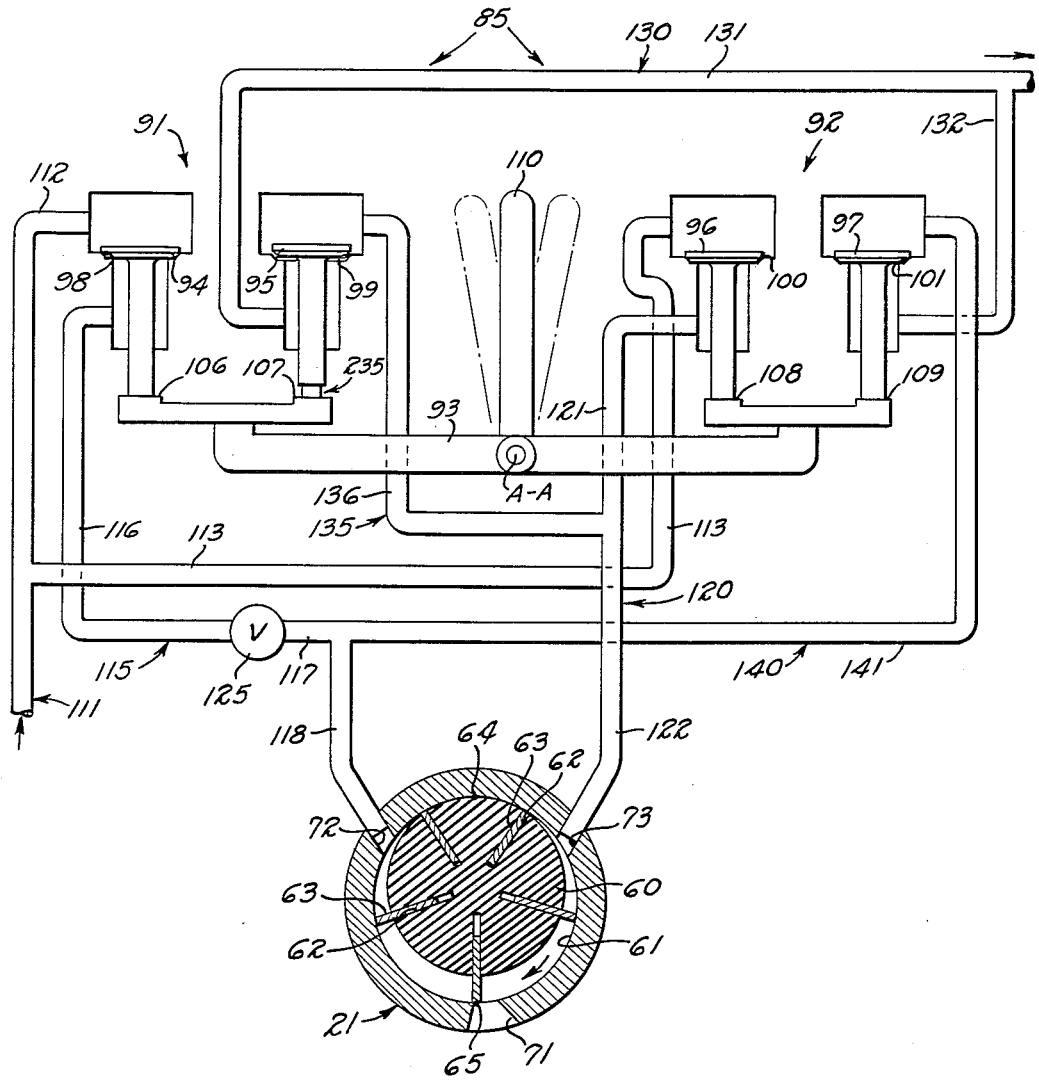

United States Patent Office 2,741,460
Patented Apr. 10, 1956

2,741,460

POWER TONGS AND CONTROL SYSTEM THEREFOR

Robert I. Gardner, Los Angeles, Calif., assignor to Hillman-Kelley, Los Angeles, Calif., a partnership of California Application October 23, 1950, Serial No. 191,702

13 Claims. (Cl. 255—35)

My invention relates in general to power tongs or wrenches for application to such things as pipes, rods or the like, and, more particularly, to a control system for power wrenches.

In general, a power wrench of the type under consideration herein includes a housing which provides an annular stator, an annular rotor carrying a suitable pipe-gripping structure being disposed within the annular stator and being rotatable about the axis thereof. The pipe-gripping structure conventionally includes jaw means having at least two relatively movable jaws for gripping a pipe to be rotated, and includes means for closing and opening the jaws so that the latter respectively engage and disengage the pipe. In order to permit lateral application of such a power wrench to a pipe, the rotor and stator are provided with registrable radial throats through which the pipe may be inserted into the interior of the rotor and into the pipe-gripping structure. Such a power wrench is usually suspended in a manner to permit it to be swung into and out of engagement with a pipe to be rotated, although it may be mounted in other ways also.

Power wrenches of this type are customarily operated by reversible fluid motors and preferably by reversible air motors, the air motors being mounted on the housings of the wrenches and being operatively connected to the rotors thereof to drive the rotors in forward and reverse directions. As a matter of convenience, the forward direction of rotation of the rotor will be regarded as the direction of rotational movement to be imparted to a pipe having conventional or right-hand threads to connect it to a coupling, for example, the reverse or rearward direction of rotation of the rotor being regarded as the direction of rotational movement to be imparted to the pipe to disconnect it from the coupling. The forward and rearward directions of rotation of the air motor will be regarded as the directions of rotation thereof necessary to rotate the rotor in its forward and rearward directions. The rotor of such a power wrench is conventionally geared to the air motor and forward rotation of the rotor may or may not be in the same physical direction as forward rotation of the air motor, depending on the character of the gearing between the air motor and the rotor and on the manner in which the air motor is mounted relative to the rotor.

As the foregoing paragraph suggests, it is necessary to provide such a power wrench with a selector valve means controlling the delivery of air to the motor for determining the direction of rotation of the motor, the selector valve means, in one of its operating positions, directing air to one side of the motor to rotate it in its forward direction and, in its other operating position, directing air to the opposite side of the motor to rotate it in the reverse direction.

A primary object of the invention is to provide a control system for a power wrench which includes such a selector valve means.

In addition to controlling the direction of rotation of the motor, it is also necessary in such a power wrench to control the operation of the motor in a manner to cause the radial throat in the rotor to register with the radial throat to the stator whenever it is necessary to apply the wrench to a pipe, or disengage it therefrom. This necessitates stopping the motor with the radial throats in the annular rotor and stator precisely in registry.

The primary object of the invention also includes the provision of a control system which includes means for automatically stopping the motor with the radial throats in the rotor and stator precisely in registry.

An important object of the invention is to provide such an automatic stop means which comprises control valve means regulating the intake and exhaust of air by the air motor for opening and closing the intake and exhaust passages of the motor in unison and which comprises means controlled by the rotor for moving the control valve means to its closed position to close the intake and exhaust passages in unison as the radial throat in the rotor approaches registry with the radial throat in the stator. An important advantage of this construction is that, by closing the exhaust passage of the motor, a rapidly increasing back pressure is applied to the motor to brake it to a stop in a minimum coasting distance which may be duplicated repeatedly. Thus, this construction insures accurate registration of the radial throats in the rotor and stator time after time, and avoids any necessity for cutting off delivery of air to the motor well in advance of registration of the throats in the rotor and stator, as is necessary with many power tongs now in use.

Another important object of the invention is to provide such a control system wherein the control valve means regulating the intake and exhaust of air forms part of the selector valve means for regulating the direction of delivery of the air to the motor.

Another object is to provide a control system wherein a single actuating element, preferably a lever, operates both the selector valve means and the control valve means so that the operator of the tongs may control the entire operation thereof with but one lever.

Another object is to provide a control system which includes a pair of control valve means for regulating the intake and exhaust of air by the motor, the two control valve means forming the selector valve means and respectively regulating the intake and exhaust of air during forward and reverse rotation of the motor.

An important object is to provide an automatic stop means which includes latch means for retaining one of the control valve means in its open position and which includes means actuable by an element on the rotor for releasing the latch means to permit closure of said one control valve means as the radial throat in the rotor approaches registry with the radial throat in the stator, the braking action provided by the application of back pressure to the motor rapidly braking the motor and rotor to a stop with the radial throat in the rotor in registry with the radial throat in the stator.

As will be pointed out in more detail hereinafter, it is customary to employ a pipe-gripping structure which disengages the pipe during reverse rotation of the rotor, and it is therefore convenient to provide an automatic stop means which operates only during rearward rotation of the rubber since the automatic stop means may be put into operation immediately upon disengagement of the pipe-gripping structure from the pipe to bring the radial throats in the rotor and stator into registry preparatory to disengaging the tongs from the pipe. However, it will be understood that the automatic stop means may operate during rotation of the rotor in the forward direction as well, or in either direction.

Another object of the invention is to employ a reversible air motor of the radially movable vane type having three passages controlling the intake and exhaust of air, one of the passages being a main exhaust passage and the other two passages being intake and auxiliary exhaust passages, respectively, or auxiliary exhaust and intake passages, respectively, depending upon the direction of rotation of the motor. With such a motor, most of the air between the vanes is exhausted through the main exhaust passage after expansion, additional air being exhausted through the auxiliary exhaust passage to prevent compression thereof between the vanes as the vanes move radially inwardly.

Another object of the invention is to provide control valve means which control the intake and exhaust of air through the intake and auxiliary exhaust passages, the main exhaust passage preferably discharging directly to the atmosphere.

Another object of the invention is to provide means for varying the back pressure applied to the motor during rotation of the motor in the reverse direction. A related object is to vary the back pressure applied to the motor during reverse rotation by providing a control valve means regulating the intake and auxiliary exhaust passages during reverse rotation which includes an auxiliary exhaust valve and means for holding it off its seat various distances when it is in its closed position so as to reduce the back pressure applied to the motor by various amounts from the maximum back pressure attainable with the valve on its seat.

The foregoing objects and advantages of the present invention, together with various other objects and advantages thereof which will become apparent, may be attained with the exemplary embodiment of the invention which is illustrated in the accompanying drawings and which is described in detail hereinafter. Referring to the drawings:

Fig. 1 is a side elevational view of a power tongs or wrench which embodies the invention;

Fig. 2 is a sectional view taken along the broken line 2—2 of Fig. 1, Fig. 2 being, in effect, a plan view of the power wrench with the air motor thereof and a portion of the control system of the invention removed;

Fig. 3 is an enlarged, fragmentary, semidiagrammatic view illustrating a portion of the control system of the invention which is associated with the rotor and stator of the power wrench;

Fig. 4 is a fragmentary side elevational view on an enlarged scale showing the air motor and all of the control system of the invention except for that portion thereof which is illustrated in Fig. 3;

Fig. 5 is a plan view, partially in section, of the structure illustrated in Fig. 4 and is taken in the direction indicated by the arrow 5 in Fig. 4;

Figs. 6 and 7 are fragmentary sectional views respectively taken along the broken lines 6—6 and 7—7 of Fig. 5;

Fig. 8 is a transverse sectional view through the air motor which is taken along the broken line 8—8 of Fig. 6, the internal structure of the air motor being shown semi-diagrammatically as a matter of convenience;

Figs. 9 and 10 are transverse sectional views respectively taken in the directions indicated by the arrows 9—9 and 10—10 of Fig. 7, Fig. 9 also indicating the plane in which the section of Fig. 7 is taken;

Figs. 11 and 12 are sectional views respectively taken along the irregular broken lines 11—11 and 12—12 of Fig. 9;

Fig. 13 is a transverse sectional view taken along the broken line 13—13 of Fig. 7;

Fig. 14 is a sectional view taken along the broken line 14—14 of Fig. 13; and

Fig. 15 is a diagrammatic view illustrating the operation of the selector valve and control valve means of the invention and illustrating the operation of the air motor in connection therewith.

Referring particularly to Figs. 1 and 2 of the drawings, illustrated therein is a power tongs or wrench 20 which is actuable by a reversible fluid motor, preferably an air motor 21, and the operation of which is controlled by a control system 22 of the invention, the control system 22 controlling the operation of the air motor and thus controlling the operation of the power wrench. The power wrench 20 per se forms no part of the present invention, the invention residing in the combination of the control system 22 with the power wrench 20 and/or the air motor 21 and in the control system 22 and its elements. The power wrench 20 is fully described in my prior application Serial No. 96,073, filed May 28, 1949, now Patent No. 2,703,221, so that it will be necessary to describe the structure and operation of the power wrench only generally herein, reference being had to my said prior application for the details of the structure and operation of the power wrench.

In general, the power wrench 20 includes a housing having an annular portion 23 which is referred to hereinafter as an annular stator, and having a handle-like arm 24 which extends laterally from the stator. When used in connection with vertical pipes, as in connecting and disconnecting drill string sections in an oil well, for example, the power wrench is adapted to be suspended in a substantially horizontal position so that it may be swung horizontally into and out of engagement with the pipe to be operated upon. Also, in order that the pipe being operated upon may be rotated in either direction, as in connecting and disconnecting pipe sections, the power wrench is adapted to be inverted with respect to the position shown in the drawings. The suspension mounting for the power wrench 20 includes a bail 25 which semi-encircles the housing of the power wrench and which is connected thereto substantially at the center of gravity of the wrench for proper balance. The suspension mounting includes a grooved roller or pulley 26 which receives the bail 25 to support the power tongs, the pulley being carried by a clevis 27 which may be supported by a cable, not shown, or the like through a swivel fitting 28. As will be apparent, the power wrench may be rotated readily about a horizontal axis upon application of a turning force thereto, the rotation being through 180° to rotate the wrench between its upright position and its inverted position whenever a different direction of rotation for a pipe being operated upon is desired. As will also be apparent, with such a suspension mounting for the power wrench, it is necessary to provide some means for restraining the housing of the wrench to prevent rotation thereof about the axis of the pipe being operated upon, this being accomplished by attaching one end of a back-up line, not shown, to a clevis 29 which is pivotally connected to the outer end of the housing arm 24. It will be understood that the foregoing suspension mounting for the power wrench 20 is merely exemplary and that the present invention is not limited thereto.

Considering the power wrench 20 in more detail, it includes an annular rotor 34 which is disposed within and which is rotatable about the axis of the annular stator 23, the rotor having a radial throat 35 which is registrable with a radial throat 36 in the stator to permit lateral insertion of a pipe into the interior of the rotor, or to permit lateral application of the power wrench to a pipe when the foregoing suspension mounting is used. The annular rotor 34 is mounted for rotation within the annular stator 23 by means of rollers 37, or the like, and is adapted to be driven by the air motor 21 through a gear-type transmission 38. The rotor 34 carries a pipe-gripping structure or means 39 which includes relatively movable jaws 40 and 41 and which includes jaw-actuating means 42 for opening or closing the jaws during rotation of the rotor. The jaw-actuating means includes braking means 43 resiliently mounted on the rotor 34 and engageable with the stator 23 for closing the jaws 40 and 41 during rotation of the rotor in a forward direction and for opening the jaws during rotation of the rotor in the opposite direction, hereinafter termed the rearward or reverse direction. In Fig. 2, the forward direction of rotation is the clockwise direction, and the rearward direction of rotation is the counterclockwise direction.

The foregoing completes a general description of the structure of the power wrench 20 and the general operation thereof will now be considered.

Prior to applying the power wrench to a pipe, the wrench is disposed in either its upright position or its inverted position, depending upon the desired direction of rotation for the pipe. Also, the radial throat 35 in the rotor 34 is brought into registry with the radial throat 36 in the stator 23 to permit introducing the pipe between the jaws 40 and 41, registration of the throats 35 and 36 being accomplished automatically with the control system 22 of the invention as will be discussed in detail hereinafter. Subsequently, the pipe is introduced into the space between the jaws 40 and 41, either by inserting the pipe into such space through the registering throats 35 and 36, or by swinging the power wrench into engagement with the pipe in such a manner that the pipe enters the space between the jaws through the registering throats, the latter procedure being used when the previously described suspension mounting is employed. Subsequently, the air motor 21 is energized to drive the rotor 34 in the forward direction by means of the control system 22 as will be described in detail hereinafter, the braking means 43 thereupon closing the jaws 40 and 41 upon the pipe to cause the pipe to rotate with the rotor. As soon as connection of the pipe to, or disconnection thereof from some other element is completed, the air motor 21 is energized for reverse rotation by the control system 22 in a manner to be described so as to rotate the rotor 34 in the reverse direction, whereupon the braking means 43 opens the jaws 40 and 41 to release the pipe. By means of the control system 22, the radial throat 35 in the rotor 34 may again be brought into registry with the radial throat 36 in the stator 23 to permit disengagement of the power wrench 20 from the pipe.

Continuing to refer to Figs. 1 and 2, the air motor 21 is mounted on the housing arm 24 by means of a support 50 having depending arms 51 which are bolted or otherwise secured to flanges 52 on opposite sides of the housing arm. The support 50 encircles the air motor 21 and the motor is retained within the encircling support in spaced relation relative thereto by means of set screws 53, or the like. The motor 21 drives a shaft 54 which extends into the housing of the power wrench 20 and is connected to the transmission 38 thereof. Preferably, the transmission 38 is a two-speed transmission, and includes means 55 actuable by a handle 56 for shifting from one speed ratio to another, the handle being pivotally connected at 57 to a bracket 58 which is suitably connected to the housing arm 24.

As best shown in Fig. 8, the air motor 21, which, as hereinbefore indicated, is reversible, is illustrated as being of the radially movable vane type and includes a rotor 60 which is operatively connected in a manner not shown to the shaft 54, the rotor 60 being connected to the shaft 54 by gearing, for example. The rotor 60 is eccentrically disposed in a chamber 61 and is provided with radial slots 62 for radially slidable vanes 63. Because of the eccentric positioning of the rotor 60 within the chamber 61, the volume of the spaces between the vanes 63 is a minimum when such spaces are opposite a point 64 and is a maximum when such spaces are opposite a point 65, the points 64 and 65 being diametrically opposite each other. The intake and exhaust of air by the motor 21 is controlled by three ports 71, 72 and 73, the port 71 being located adjacent the point 65 of maximum volume of the spaces between the vanes 63 and being a main exhaust port, and the ports 72 and 73 being disposed adjacent and on opposite sides of the point 64 of minimum volume of the spaces between the vanes 63 and being intake or auxiliary exhaust ports, depending upon the direction of rotation of the motor. As is well known in the art, if the port 73 acts as an intake port, air admitted to the motor 21 therethrough drives the rotor in the clockwise direction, as viewed in Fig. 8. Most of the air exhausts through the main exhaust port 71 after expansion and additional residual air trapped in the spaces between the vanes 63 after communication between such spaces and the main exhaust port 71 is cut off is exhausted through the port 72, which serves as an auxiliary exhaust port during rotation of the motor in this direction. As a matter of convenience, the clockwise direction of rotation, as viewed in Figs. 8 and 15, will be regarded as the forward direction of rotation of the motor 21 and will be regarded as the direction of rotation of the motor required to rotate the rotor 34 of the power wrench in its forward direction.

Conversely, rotation of the motor 21 in the counterclockwise direction, as viewed in Figs. 8 and 15, will be regarded as rearward rotation thereof and will be regarded as the direction of rotation required to drive the rotor 34 in its rearward or reverse direction. As will be apparent, during rearward or reverse rotation of the motor 21, the port 72 acts as the intake port and the port 73 acts as the auxiliary exhaust port, the main exhaust port 71 serving to exhaust most of the air from the spaces between the vanes 63 during rotation of the motor 21 in either direction. Preferably, the motor 21 exhausts directly to the atmosphere through the main exhaust port 71, although an exhaust line, not shown, may be connected to the motor in communication with the main exhaust port 71 if desired.

The ports 72 and 73 respectively communicate with chambers 74 and 75 which, in turn, communicate with ports 76 and 77 leading to the exterior of the motor 21. The ports 76 and 77 communicate with ports 78 and 79, respectively, in a fitting 80 which is secured to the motor 21 by means of bolts 81, as best shown in Fig. 6, or otherwise. Extending into the fitting 80 into communication with the ports 78 and 79, respectively, are pipes 82 and 83, the latter extending at their opposite ends into a combined selector and control valve means 85 of the control system 22 of the invention, the valve means 85 being secured to the motor 21, as best shown in Fig. 6, by means of a bolt 86 threaded into a plug 87 which, in turn, is threaded into a counterbore 88 in the air motor.

The combined selector and control valve means 85 will be described in detail hereinafter and in order that the detailed description thereof may be more readily followed, the relationship of the valve means 85 to the air motor 21 and its general structure and operation will first be considered in connection with Fig. 15 of the drawings, which diagrammatically shows the valve means 85 and the air motor 21. Referring to Fig. 15, the valve means 85 includes two control valve means 91 and 92 actuable by an actuating means 93. The control valve means 91 includes poppet valves 94 and 95 and the control valve means 92 includes poppet valves 96 and 97, the actuating means 93 being adapted to unseat the poppet valves 94 and 95 in unison without unseating the valves 96 and 97, and vice versa, the seats for the valves 94 to 97 being designated by the numerals 98 to 101, respectively. The valves 94 to 97 are biased toward their respective seats 98 to 101 by springs (Figs. 7 and 9 to 12) 102 to 105, respectively.

Preferably, the actuating means 93 comprises a lever which is mounted for pivotal movement about an axis A—A located between the valves 94 and 95 and the valves 96 and 97, the actuating means or lever 93 having contacts 106 and 109 which engage the stems of the valves 94 to 97, respectively. The actuating lever 93 also includes a handle 110 which, when moved to the right, as viewed in Fig. 15, rotates the actuating lever to unseat the valves 94 and 95 in unison without unseating the valves 96 and 97 and which, when rotated to the left, as viewed in Fig. 15, rotates the actuating lever to unseat the valves 96 and 97 in unison without unseating the valves 94 and 95.

The control valve means 91 controls the intake and auxiliary exhaust of air by the motor 21 during rotation thereof in the rearward direction, i. e., the counterclockwise direction in Fig. 15, and the control valve means 92 controls the intake and auxiliary exhaust of air by the motor during forward rotation thereof, i. e., during rotation thereof in the clockwise direction in Fig. 15, the valves 94 and 96 being intake valves and the valves 95 and 97 being auxiliary exhaust valves. More particularly, an inlet passage 111, diagrammatically exemplified in Fig. 15 by branching pipes 112 and 113, communicates with the upstream sides of the intake valves 94 and 96. The downstream side of the intake valve 94 communicates with the port 72 of the motor 21 through an intake passage 115, diagrammatically exemplified by pipes 116, 117 and 118, and the downstream side of the intake valve 96 communicates with the port 73 of the motor through an intake passage 120, diagrammatically exemplified by pipes 121 and 122. Thus, when the intake valve 94 is opened by the actuating lever 93, compressed air is delivered to the port 72 to drive the motor 21 in the reverse direction, and when the intake valve 96 is opened, compressed air is delivered to the port 73 to drive the motor in the forward direction. The intake passage 115 includes, in addition to elements not yet described, such elements as the chamber 74, the port 76, the port 78 and the pipe 82, and the intake passage 120 includes, in addition to elements not yet described, such elements as the chamber 75, the port 77, the port 79 and the pipe 83.

A throttle valve 125 is provided in the intake passage 115 to permit varying the rate of delivery of air to the motor 21 during rearward rotation thereof, thereby permitting variations in the speed of the motor during rearward rotation.

The exhaust valves 95 and 97 control the auxiliary exhaust of air by the motor 21 and communicating with the downstream sides thereof is an outlet passage 130, diagrammatically exemplified in Fig. 15 by confluent pipes 131 and 132. The upstream side of the exhaust valve 95 communicates with the port 73 of the motor through a passage 135, diagrammatically exemplified by the pipe 122 and a pipe 136. The upstream side of the exhaust valve 97 communicates with the port 72 of the motor through an exhaust passage 140 which is diagrammatically exemplified as including the pipe 118 and a pipe 141.

Considering the operation of the combined selector and control valve means 85 in connection with the motor 21 with reference to Fig. 15 of the drawings, movement of the handle 110 to the left, as viewed in Fig. 15, opens the intake and exhaust valves 96 and 97 in unison to open the intake and exhaust passages 120 and 140, whereupon the motor 21 rotates in the forward direction. Conversely, moving the handle 110 to the right opens the intake and exhaust valves 94 and 95 in unison to open the intake and exhaust passages 115 and 135, whereupon the motor 21 rotates in the reverse or rearward direction. Thus, the control valve means 91 and 92, considered individually, control the operation of the motor 21 in the reverse and forward directions, respectively, and the two control valve means, considered collectively, act as a selector means to control the direction of rotation of the motor.

As will be apparent, the provision of the exhaust valves 95 and 97 in the respective control valve means 91 and 92 results in cutting off the exhaust of air through the ports 72 and 73, respectively, simultaneously with the cutting off of the compressed air delivery to the ports 72 and 73 by the intake valves 94 and 96, respectively. Consequently, coasting of the motor 21 after closure of either of the control valve means 91 and 92 results in the development of a back pressure which brakes the motor to a stop very rapidly. For example, if the control valve means 91 is opened so that the motor 21 is rotating in the rearward direction, closure of this control valve means results in cutting off the escape of air from that space between the vanes 63 which is in communication with the port 73 so that the air in such space is compressed to brake the motor to a stop very rapidly, the port 73 being the auxiliary exhaust port during rearward rotation, as hereinbefore discussed. Similarly, during forward rotation of the motor 21, closure of the control valve means 92 results in cutting off the escape of air from that space between the vanes 63 which is in communication with the port 72 so that a back pressure is developed which brakes the motor to a stop very rapidly. As will be discussed in more detail hereinafter, this is an important feature of the invention since it insures accurate registration of the radial throat 35 in the rotor 34 with the radial throat 36 in the stator 23.

It will be noted that closure of the control valve means 91 during rearward rotation of the rotor tends to produce a vacuum in that space between the vanes 63 which is in communication with the port 72, and that closure of the control valve means 92 during forward rotation of the motor tends to create a vacuum in that space between the vanes 63 which is in communication with the port 73. Such vacuums, or, more accurately, partial vacuums, tend to assist in braking the motor to a stop in either direction of rotation, but the effect of such partial vacuums is small as compared to the effect of the back pressures discussed above since the maximum braking pressure differentials which can theoretically be applied to the motor 21 in this manner are limited to the difference between atmosphere pressure and absolute zero. On the other hand, there is no theoretical limit to the back pressures which may be applied to the motor 21 by closure of the exhaust valves 95 and 97.

Considering the structural details of the combined selector and control valve means 85 with particular reference to Figs. 4 to 14 of the drawings, it includes housing elements 145, 146, and 147, the latter being secured to the air motor 21 by the bolt 86 threaded into the plug 87 as hereinbefore described. The housing element 146 is attached to the housing element 147 by bolts 148 and the housing element 145 is attached to the housing element 146 by bolts 149, all as best shown in Fig. 6.

The valves 94 to 97 are carried by the intermediate housing element 146, the valve seats 98 to 101 for the respective valves 94 to 97 being formed in the intermediate housing element. The valve springs 102 to 105 are seated in bores, not identified by reference numerals, in the housing element 145 and are seated against the heads of the respective valves 94 to 97 to bias them into engagement with their respective valve seats 98 to 101, the heads of the valves being provided with axial projections, not identified by reference numerals, which are encircled by the valve springs to retain the valve springs in their proper positions relative to the heads of the valves. As best shown in Figs. 7, 11 and 12, the stems of the valves 94 to 97 project from the intermediate housing element 146 into a cavity 150 in the innermost housing element 147, the actuating lever 93 being disposed within the cavity 150 with its contacts 106 to 109 in positions to engage the stems of the respective valves 94 to 97 and with its handle 110 projecting downwardly from the cavity 150. The actuating lever 93 is pivotally mounted within the cavity 150 by means of pivot pins 151 which extend into the cavity, as best shown in Figs. 7 and 14. The pivot pins 151 define the pivot axis A—A of the actuating lever 93, the contacts 106 and 107 and the corresponding valves 94 and 95 being disposed on one side of such axis and the contacts 108 and 109 and the corresponding valves 96 and 97 being disposed on the opposite side thereof. As best shown in Fig. 9, the valves 94 to 97 are disposed at the respective corners of a square in the particular construction illustrated, although the particular arrangement of the valves is unimportant so long as the valves 94 and 95 are disposed on one side of the axis A—A and the valves 96 and 97 are disposed on the opposite side thereof.

As best shown in Fig. 5, the inlet passage 111 includes a pipe 154 which is threaded into the housing element 145 and to which a flexible air supply line, not shown, may be connected, air entering the housing element 145 through the pipe 154 flowing into a space 155 in the housing element 145 and from this space through an air strainer unit 156 which is threaded into the housing element 145 so as to be readily removable for cleaning. More particularly, the air flows from the space 155 through one end of a tubular strainer element 157, the air flowing laterally through the strainer element into an annular space 158 which communicates with an axial passage 159 leading to the inner end face of the housing element 145, as best shown in Fig. 6. Thus, the air entering the housing element 145 flows therethrough by way of the space 155, the strainer element 157, the annular space 158 and the axial passage 159, the foregoing elements all being elements of the inlet passage 111.

The inner end of the axial passage 159, which is visible in Fig. 10, registers with a central portion of an elongated, irregular recess 160 in the outer end face of the intermediate housing element 146. The ends of the recess 160 are circular and register with circular recesses 161 and 162, respectively, in the inner end face of the housing element 145. The ends of the recess 160 and the respective registering recesses 161 and 162 form the inner ends of the branching inlet passage 111, which terminates at the intake valves 94 and 96 on the upstream sides thereof. A gasket 163 between the housing elements 145 and 146 separates the foregoing recesses and others to be described.

Referring particularly to Fig. 11, the intake passage 115 leading from the intake valve 94 to the port 72 of the motor 21 includes a bore 166 which encircles the stem of the intake valve 94 and which is concentric with the corresponding circular end of the recess 160, the valve seat 98 for the intake valve 94 being at the junction of the bore 166 with the corresponding circular end of the recess 160. Intersecting the bore 166 is a bore 167 which communicates at one end with a parallel, but laterally offset, bore 168 in the housing element 146, the previously mentioned throttle valve 125 for controlling the delivery of air to the motor 21 during rotation thereof in the reverse direction having a stem disposed in the bore 168 and being threaded into a counterbore 169. The throttle valve 125 is provided with a slot 170 in its outer end for the reception of a screw driver, or the like, for adjusting the flow through the intake passage 115 during reverse rotation of the motor 21, the throttle valve 125 being sealed by packing 171 disposed in a second counterbore 172 and retained therein by a gland nut 173 threaded into the counterbore 172. The intake passage 115 also includes a port 176 which intersects the bore 168 and which communicates with a central portion of an irregular recess 177 in the outer end face of the intermediate housing element 146. A complementary recess 178 in the inner end face of the housing element 145 registers with the recess 177, the recesses 177 and 178 being best shown in Figs. 9 and 10, respectively. As best shown in Fig. 9, the pipe 82 leading to the port 72 of the motor 71 communicates with the registering recesses 177 and 178, the pipe 82 extending into and being connected to the housing element 146 in substantially the same manner as the pipe 83 as will be discussed in more detail hereinafter. Thus, the intake passage 115 leading from the intake valve 94 to the port 72 of the motor includes the bores 166, 167 and 168, the port 176, the registering recesses 177 and 178, the pipe 82, the port 78 in the fitting 80, the port 76, the chamber 74 and the port 72 of the motor.

As best shown in Fig. 7, the intake passage 120 leading from the intake valve 96 to the port 73 of the motor 21 includes a bore 181 which is concentric with the corresponding circular end of the recess 160 and which co-operates therewith to define the valve seat 100 for the intake valve 96, the bore 181 intersecting an L-shaped passage 182 in the housing element 146. The L-shaped passage 182 communicates with a recess 183 in the outer end face of the housing element 146, a complementary recess 184 in the inner end face of the housing element 145 registering with the recess 183. The pipe 83 leading to the port 73 of the motor 21 communicates with the registering recesses 183 and 184, the pipe 83, as best shown in Fig. 5, extending into a bore 185 in the housing element 146. The bore 185 communicates with the registering recesses 183 and 184, as will be apparent from Fig. 5. As previously indicated, the pipe 82 may be connected to the housing element 146 in communication with the registering recesses 177 and 178 in a similar manner. Thus, the intake passage 120 connecting the intake valve 96 to the port 73 for forward rotation of the motor includes the bore 181, the L-shaped passage 182, the registering recesses 183 and 184, the pipe 83, the port 79 in the fitting 80, the port 77, the chamber 75 and the port 73.

Considering the exhaust passage 135 connecting the port 73 to the exhaust valve 95 with particular reference to Figs. 9 and 12, it will be noted that the exhaust valve is disposed in the registering recesses 183 and 184. Thus, during rearward rotation of the motor 21, residual air exhausted through the port 73 enters the registering recesses 183 and 184 on the upstream side of the exhaust valve 95. Thus, the exhaust passage 135 includes the port 73, the chamber 75, the port 77, the port 79 in the fitting 80, the pipe 83 and the registering recesses 183 and 184.

Similarly, during forward rotation of the motor 21, residual air exhausted through the port 72 of the motor ultimately enters the registering recesses 177 and 178 on the upstream side of the exhaust valve 97. Thus, the exhaust passage 140 connecting the port 72 to the exhaust valve 97 includes the port 72, the chamber 74, the port 76, the port 78 in the fitting 80, the pipe 82 and the registering recesses 177 and 178.

Referring particularly to Fig. 12, it will be noted that the housing element 146 is provided with bores 190 and 191 which register with the recesses 183 and 177, respectively, in the housing element 146 and co-operate therewith to provide the valve seats 99 and 101, respectively, for the valves 95 and 97, respectively. The bores 190 and 191 communicate with a bore 192 which leads to the exterior of the housing element 146 to discharge air passing through the exhaust valves 95 and 97 directly into the atmosphere. It will be understood, however, that an exhaust line, not shown, may be connected to the housing element 146 in communication with the bore 192, if desired. Thus, the outlet passage 130 for the exhaust valves 95 and 97 includes the bores 190 to 192, inclusive.

The foregoing completes the detailed description of the structure of the combined selector and control valve means 85 and its relation to the air motor 21, and the structure for operating the valve means 85 to stop the rotor 34 of the power wrench 20 with its radial throat 35 in registry with the radial throat 36 in the stator 23 will now be considered. Referring particularly to Figs. 1, 4 and 6, threaded into the lower side of the intermediate housing element 146 of the valve means 85 is a depending post 200. As best shown in Fig. 4, disposed on opposite sides of the post 200 at the lower end thereof are arcuate brackets 201, the brackets being clamped onto the post 200 by bolts 202 and also being directly secured thereto by a bolt 203. Extending between the brackets 201 adjacent free ends thereof is a tubular stop 204 carried by a bolt 205 which extends through the brackets. An L-shaped latch 210 is disposed between the brackets 201 and is pivotally connected to the free ends thereof by means of a bolt 211 through the outer end of one arm of the latch. The other arm of the latch 210 is provided with a shoulder 212 which is adapted to engage a complementary shoulder 213 at the lower end of the handle 110 of the actuating lever 93 to retain the actuating lever in such a position that it holds the intake and exhaust valves 94 and 95 controlling the intake and exhaust of air by the motor 21 during rearward rotation thereof in their open positions, the valve springs 104 and 105 holding the respective intake and exhaust valves 96 and 97 closed under such conditions.

Connected to the L-shaped latch 210 at the junction of the two arms thereof is a cable or wire 216 which is enclosed by a sheath 217. Carried by the sheath 217 and secured thereto, as by a set screw 218, is a collar 219 which serves as a seat for one end of a compression spring 220, the opposite end of the spring being seated against the latch 210. As will be apparent, the spring 220 biases the latch 210 into its extended position wherein it engages the stop 204 and wherein the shoulder 212 thereon is adapted to engage the shoulder 213 on the handle 110 to hold the valves 94 and 95 open. As will also be apparent, a pull on the cable 216 toward the right, as viewed in Fig. 4, will move the latch 210 into its retracted position away from the stop 204 so as to release the handle 110, thereby permitting the valve springs 102 and 103 to close the respective valves 94 and 95.

As best shown in Figs. 2 and 3, the opposite end of the cable 216 is connected to one arm of a generally L-shaped cam follower element 223 which is pivotally mounted on the annular stator 23 by means of a bolt 224, or the like. The other arm of the cam follower element 223 is adapted to be engaged by a rise 225 of a cam element 226 which is bolted or otherwise secured to the annular rotor 34 in a position such that the rise 225 engages the cam follower element 223 as the radial throat 35 in the rotor approaches registry with the radial throat 36 in the stator. Engagement of the rise 225 with the cam follower element 223 rotates the latter to exert a pull force on the cable 216 toward the right, as viewed in Figs. 2 to 4, thereby rotating the latch 210 into its retracted position to release the handle 110 so as to permit the valves 94 and 95 to close. As will be apparent, the cam element 226 operates the cam follower element 223 only during rotation of the rotor 34 in the reverse direction, i. e., in the counterclockwise direction as viewed in Fig. 2, although it will be understood that the structure may be modified to release the handle 110 during either reverse or forward rotation of the rotor, or both, if desired.

Considering the operation of the control system 22 of the invention, it will be assumed that the jaws 40 and 41 of the power wrench 20 are open and that the radial throat 35 in the rotor 34 is in registry with the radial throat 36 in the stator 23 so that a pipe, not shown, may be disposed in the space between the jaws 40 and 41 by insertion through the registering throats 35 and 36, either by actually inserting the pipe into such space through the throats, or by swinging the power wrench toward the pipe in such a manner that the pipe passes through the registering throats into the space between the jaws. With the pipe so positioned between the jaws 40 and 41, the operator pulls the handle 110 of the actuating lever 93 toward the post 200, either by grasping the handle directly, or by grasping one or both of a pair of tabs 230, Fig. 13, which extend laterally from the handle. Moving the handle 110 toward the post 200 results in opening of the intake and exhaust valves 96 and 97, the intake and exhaust valves 94 and 95 remaining closed. As hereinbefore discussed, opening the valves 96 and 97 results in forward rotation of the air motor 21, which drives the rotor 34 in the forward direction. As the rotor 34 rotates in the forward direction, the braking means 43 closes the jaws 40 and 41 upon the pipe therebetween, as more fully described in my aforesaid prior application. As soon as the jaws close upon the pipe, the pipe is rotated with the rotor 34 to connect it to, or disconnect it from, some other element depending upon whether the power wrench 20 is in its upright position or in its inverted position.

As soon as the pipe has been rotated to the extent necessary to complete its connection or disconnection, the operator releases the handle 110 to permit the valves 96 and 97 to close, and subsequently moves it away from the post 200 to open the valves 94 and 95, thereby causing the motor 21 to rotate in the reverse direction and thereby causing the rotor 34 to be driven in the reverse direction. As will be apparent, the latch 210 retains the handle 110 in a position such that the valves 94 and 95 are retained in their open positions, the valves 96 and 97 being held closed by their springs under such conditions. Upon reversal of the direction of rotation of the rotor 34 in this manner, the braking means 43 opens the jaws 40 and 41 in the manner fully described in my aforementioned prior application. As the rotor continues to rotate in the rearward direction, the rise 225 of the cam element 226 engages the cam follower element 223 as the radial throat 35 in the rotor approaches registry with the radial throat 36 in the stator 23. When the cam element 226 engages the cam follower element 223 in this manner, the cable 216 retracts the latch 210 to release the handle 110, whereupon the springs controlling the valves 94 and 95 move the valves onto their seats, thereby cutting off both the intake and auxiliary exhaust of air by the air motor 21. As previously discussed, cutting off the intake of air in this manner tends to produce a vacuum in that space between the vanes 63 of the motor which is in communication with the port 72, the latter being the intake port during reverse rotation. Such vacuum, or partial vacuum, produces a braking force tending to bring the motor 21 and the rotor 34 driven thereby to a stop. More important, cutting off the auxiliary exhaust of air in this manner tends to apply a back pressure to the motor because of the compression of the air in that space between the vanes 63 of the motor which is in communication with the port 73, the latter being the auxiliary exhaust port during reverse rotation of the motor. Such back pressure also acts to brake the motor and the rotor 34 driven thereby to a stop and is much more effective than the vacuum or partial vacuum on the intake side for the reasons hereinbefore discussed. Consequently, the motor 21 and the rotor 34 are brought to a stop very rapidly as a result of the application of back pressure to the motor so that consistently accurate registration of the radial throats 35 and 36 in the rotor 34 and stator 23 may be attained. Such consistently accurate registration of the throats 35 and 36 results because normal variations in the short coasting distance permitted by the application of the back pressure to the motor 21 have negligible effects on the throat registration. Also, the rapid braking of the motor 21 and the rotor 34 saves considerable time in the operation of the power wrench 20.

As will be apparent, as soon as the rotor 34 has been brought to a stop in the foregoing manner with the throat therein in registry with the throat 36 in the stator 23, the power wrench may be disengaged from the pipe and another pipe may be inserted into the space between the jaws 40 and 41 and the foregoing steps repeated.

With the particular construction illustrated for the power wrench 20, the inertia of the braking means 43 and its position relative to the throat 35 in the rotor 34 are such that the rapid deceleration of the rotor produced by the back pressure applied to the motor 21 during reverse rotation may result in movement of the braking means into the radial throat 35 in the rotor to some extent, such movement of the braking means relative to the rotor occurring because of the resilient mounting of the braking means on the rotor. In order to keep the braking means 43 from entering and partially obstructing the throat 35 in the rotor 34, I prefer to provide the exhaust valve 95 controlling the auxiliary exhaust of air by the motor 21 during reverse rotation thereof with adjustable means for holding it off its seat 99 any desired distance.

Referring particularly to Fig. 7, the adjustable means 235 may comprise an element 236 threaded into the end of the stem of the valve 95 and adapted to engage the corresponding contact 107 on the actuating lever 93. As will be apparent, varying the distance which the element 236 is threaded into the stem of the valve 95 will vary the extent to which the valve 95 is held off its seat 99 so as to vary the back pressure applied to the motor 21 as it is braked to a stop during reverse rotation thereof. Thus, the adjustable means 235 may be so set as to prevent inertia effects from causing the braking means 43 to obstruct the throat 35 in the rotor 34. Similar results may be attained by varying the reverse speed of the motor 21 by means of the throttle valve 125, although the use of the adjustable means 235 for this purpose is preferred since it permits employing the maximum speed of reverse rotation for the motor.

As will be apparent, the motor 21 is braked to a stop during forward rotation just as rapidly as during rearward rotation, but this is of no consequence since the braking means 43 does not tend to obstruct the throat 35 in the rotor 34 when stopping during forward rotation. Consequently, the exhaust valve 97 controlling the auxiliary exhaust of air during forward rotation may seat completely.

It will thus be apparent that the present invention provides a control system which permits the operator to operate the power tongs 20 in either the forward direction or the reverse direction and which automatically stops the rotor 34 with the throat 35 therein in registry with the throat 36 in the stator 23 during rearward rotation, all of this being accomplished by the simple expedient of moving the single actuating handle 110 into one or the other of two operating positions. Thus, the operator has a minimum number of controls to contend with in operating the power tongs 20, which is an important feature.

While I have disclosed an exemplary embodiment of my invention, it will be understood that various changes, modifications and substitutions may be incorporated therein and that various elements thereof may be employed in connection with other apparatuses, all without departing from the spirit of the invention.

I claim as my invention:

1. In a power tongs, the combination of: an annular stator providing a radial throat for lateral insertion of a pipe thereinto; an annular rotor carried by and rotatable about the axis of said stator and having a radial throat which is registerable with said radial throat in said stator for lateral insertion of the pipe through said radial throats into said rotor; pipe-gripping means carried by said rotor; a fluid motor operatively connected to said rotor for rotating said rotor and having intake and exhaust passages for an operating fluid; control valve means movable between open and closed positions for opening and closing said intake passage; means for biasing said control valve means toward its closed position; latch means for retaining said control valve means in its open position; and means controlled by said rotor for releasing said latch means as said radial throat in said rotor approaches registry with said radial throat in said stator.

2. A power tongs as defined in claim 1 wherein the means last defined includes a cam follower element on said stator, a cam element on said rotor in a position to actuate said cam follower element as said radial throat in said rotor approaches registry with said radial throat in said stator, and means connecting said cam follower element to said latch means for releasing said latch means when said cam follower element is actuated by said cam element.

3. A power tongs according to claim 2 wherein the means last defined includes cable means connected at one end to said cam follower element and at its other end to said latch means.

4. In a power tongs, the combination of: a housing including an annular stator providing a radial throat for lateral insertion of a pipe thereinto; an annular rotor carried by and rotatable about the axis of said stator, said rotor having a radial throat which is registrable with said radial throat in said stator for lateral insertion of the pipe through said radial throats into said rotor; pipe-gripping means carried by said rotor; an air motor carried by said stator and operatively connected to said rotor for rotating said rotor, said motor having intake and exhaust passages for air for operating said motor; control valve means movable between open and closed positions for opening and closing said intake and exhaust passages in unison; and means controlled by said rotor for moving said control valve means to its closed position as said radial throat in said rotor approaches registry with said radial throat in said stator.

5. A power tongs according to claim 4 wherein the means last defined includes means for biasing said control valve means toward its closed position, latch means for retaining said valve means in its open position, and means controlled by said rotor for releasing said latch means as said radial throat in said rotor approaches registry with said radial throat in said stator.

6. A power tongs as set forth in claim 5 wherein the means last defined includes a cam follower element on said stator, a cam element on said rotor in a position to actuate said cam follower element as said radial throat in said rotor approaches registry with said radial throat in said stator, and means connecting said cam follower element to said latch means for releasing said latch means when said cam follower element is actuated by said cam element.

7. A power tongs according to claim 4 wherein said control valve means includes means operative when said control valve means is in its closed position for substantially, but not completely, closing said exhaust passage so as to reduce the back pressure applied to said motor.

8. A power tongs as defined in claim 7 wherein the means last defined includes a valve seat encompassing said exhaust passage and an exhaust valve adapted to seat on said valve seat, and includes adjustable means for holding said exhaust valve off its seat when said valve means is in its closed position.

9. A power tongs according to claim 4 wherein said motor is reversible and wherein said passages act as intake and exhaust passages, respectively, or as exhaust and intake passages, respectively, depending upon the direction of rotation of said motor, said power tongs including selector valve means for connecting said passages to a source of air under pressure and to the atmosphere, respectively, or to the atmosphere and to a source of air under pressure, respectively.

10. In a power tongs, the combination of: a housing including an annular stator providing a radial throat for lateral insertion of a pipe thereinto; an annular rotor carried by and rotatable about the axis of said stator, said rotor having a radial throat which is registrable with said radial throat in said stator for lateral insertion of the pipe through said radial throats into said rotor; pipe gripping means carried by said rotor; a reversible air motor carried by said stator and operatively connected to said rotor for rotating said rotor, said motor having two passages for the intake and exhaust of air, said passages being intake and exhaust passages, respectively, or exhaust and intake passages, respectively, depending upon the direction of rotation of said motor; selector valve means for connecting said passages to a source of air under pressure and to the atmosphere, respectively, or to the atmosphere and to a source of air under pressure, respectively, depending upon the desired direction of rotation of said motor, said selector valve means including control valve means movable between open and closed positions and controlling the flow of air through both said passages for opening and closing said passages in unison; and means actuable by said rotor for moving said control valve means to its closed position as said radial throat in said rotor approaches registry with said radial throat in said stator.

11. A power tongs as defined in claim 10 wherein said control valve means includes means operative when said control valve means is in its closed position for substantially, but not completely, closing that one of said passages which acts as said exhaust passage during rotation of said motor in a reverse direction so as to reduce the back pressure applied to said motor during rotation thereof in said reverse direction.

12. A power tongs according to claim 11 wherein the means last defined includes an exhaust valve seat and an exhaust valve adapted to seat on said exhaust valve seat, said exhaust valve including adjustable means for holding said exhaust valve off its seat.

13. A power tongs according to claim 10 including throttle valve means associated with that one of said passages which acts as said intake passage during rotation of said motor in a reverse direction for varying the rate of delivery of air to said motor during rotation thereof in said reverse direction.

References Cited in the file of this patent

UNITED STATES PATENTS

| | | |
|---|---|---|
| 1,486,304 | Ross | Mar. 11, 1924 |
| 2,414,638 | Dobie | Jan. 21, 1947 |
| 2,428,726 | Sturrock | Oct. 7, 1947 |
| 2,509,853 | Wilson | May 30, 1950 |
| 2,518,398 | Stone | Aug. 8, 1950 |
| 2,618,468 | Lundeen | Nov. 18, 1952 |

FOREIGN PATENTS

| | | |
|---|---|---|
| 650,574 | Great Britain | Feb. 28, 1951 |